Patented Jan. 24, 1939

2,144,932

UNITED STATES PATENT OFFICE 2,144,932

RECOVERY OF SILVER FROM ARGENTO-JAROSITE

Robert R. Porter, Old Greenwich, Conn., assignor to American Cyanamid Company, New York, N. Y., a corporation of Maine No Drawing. Application February 3, 1938, Serial No. 188,508

9 Claims. (Cl. 75—2)

This invention relates to the extraction of silver from ore containing argento-jarosite.

In the past silver ores containing argento-jarosite have presented a very serious problem because this form of silver will not float and gives difficulty in cyanidation. Hitherto argento-jarosite has been treated by a high temperature roast, usually 600°–700° C., followed by brine leaching or cyanidation. Silver recoveries are poor by this method and where cyanidation is used, there is apt to be high cyanide consumption.

According to the present invention, I have found that silver in argento-jarosite can be transformed into a soluble form or partly into a floatable form by low temperature roasting. This may be followed, however, by leaching with water or dilute acid or by immediate flotation with or without treatment with salt. The silver recovery increases with temperature up to about 500° C. where the recovery is almost 100%. As the temperature increases, recovery drops very rapidly so that at 520° C. recovery has dropped to about 75%. I have not determined definitely the reason why the use of high temperatures, as practiced in the past, reduces the silver recovery. I believe, however, that this loss of recovery may be due to side reactions taking place at high temperatures and may result in the formation of silver compounds not soluble in water or dilute acids. The present invention is, however, not limited to any particular theory of action.

In the case of ores which contain argento-jarosite as practically the only constituent, the low temperature roast followed by leaching is the best method of carrying out the present invention. However, most ores containing argento-jarosite also contain other silver compounds such as for example cerargyrite which is floatable and therefore in the case of such mixed ores, the low temperature roast is preferably combined with flotation. The ore may be floated to remove the floatable silver ores and then the flotation tailing roasted, leached and if desired, cyanided. This procedure is fairly satisfactory with ores in which argento-jarosite forms only a small proportion of the silver content. Where the argento-jarosite content is higher, it is preferable to calcine the whole ore, grind it with or without salt, preferably hot, and then float, followed by cyanidation of the flotation tailing. This process which eliminates filtration steps is very cheap and can be applied to low grade silver ores containing argento-jarosite, although it is extremely effective also with very high grade ores. A curious result is obtained when this second method is employed; namely, that the flotation concentrate contains a larger amount of silver than that which corresponds to the content of non-floatable silver. Apparently the roast causes some of the silver of the argento-jarosite to be either transformed into a floatable compound or to attach itself to floatable silver components of the ore. This is a very important advantage of this modification inasmuch as flotation is cheap whereas cyanidation requires the consumption of the relatively expensive cyanide. In most cases, therefore, where mixed ores are encountered in which the argento-jarosite is not too large a component, it is preferable to use the modification of low temperature roast followed by flotation.

The present invention will be described in conjunction with the following specific examples which illustrate both roasting and flotation, the first three examples being directed to a process in which the ore is first floated and then roasted and the later example covering the second and preferred modification. It should be understood that the invention is not limited to the details of the examples and particularly, that it is not limited to the treatment of high grade silver ores although the extremely high recoveries possible by means of the present invention show up as a larger economic saving with high grade ores having considerable argento-jarosite content than with low grade ores.

Example 1

A high grade silver-tin ore from Mexico, assaying 1874 oz. of silver per ton, 67.73% being in the form of cerargyrite and the balance argento-jarosite, was ground and floated in a Fagergren flotation machine with 0.8 lb. per ton of potassium secondary butylxanthate, 0.05 lb. per ton of dicresyl dithio-phosphoric acid, 3 lbs. per ton of soda ash and 0.05 lb. per ton cresylic acid. The concentrate assayed 10,409 oz. of silver per ton and contained 67.73% of the silver in the ore. The tailing was then roasted for two hours at a temperature of 450° C., taking one half hour to reach the temperature and maintaining it at that temperature for one and a half hours. The calcine was removed and allowed to cool in the air and then transferred into a leaching vessel where it was diluted with 2% sulfuric acid to 12% solids and agitated for twenty-four hours. The mixture was then filtered and washed and the solution and calcine assayed for silver. Slightly over 15% of the silver in the ore was removed from the solution by precipitation with iron, lead, copper or salt.

Example 2

The procedure of Example 1 was followed but the calcination was effected just under 500° C. The recovery from the solution was slightly over 20%, giving almost 100% overall silver recovery.

Example 3

The procedure of Example 1 was followed but the calcination was effected at 525° C. The total silver recovery dropped to about 75%.

Example 4

A high grade silver-tin ore from Chile, assaying about 2,000 ozs/ton and containing about one third of the silver as argento-jarosite, was roasted without fine grinding at a temperature just under 500° C. The calcine, without cooling, was placed into a ball mill and ground with hot water to form a flotation pulp. It was then ground in the presence of about 8.3% sodium chloride at about 67% solids, diluted to flotation strength and floated in a Fagergren flotation machine with 0.4 lb/ton potassium secondary butyl xanthate and 0.052 lb/ton cresylic acid. The flotation concentrate was then cleaned by flotation and the tailing cyanided for twenty-four hours with 0.1% cyanide solution (sodium cyanide equivalent) and 20 lbs/ton of lime. A cleaned flotation concentrate assaying about 12,800 ozs/ton was obtained with a rougher tail of about 235 ozs/ton. The silver recovery was 88.96% in the cleaner concentrate, 1.55% in the cleaner tails and 9.49% in the rougher tails. Cyanidation of the tailing removed a further 162 ozs/ton of the silver, leaving the cyanidation tail containing only 2.54% of the silver originally in the ore. A recovery of approximately 97.5% of the total silver was obtained with a cyanide consumption of about 8.5 lbs/ton.

What I claim is:

1. A method of treating argento-jarosite which comprises subjecting the argento-jarosite to a low temperature roast under non-reducing conditions not over 525° C. and recovering the silver by solution methods.

2. A method according to claim 1 in which the recovery is by cyanidation.

3. A method of recovering silver from ore containing argento-jarosite and floatable silver compounds which comprises subjecting the whole ore to a low temperature roast under non-reducing conditions not over 525° C., subjecting the calcine to froth flotation in the presence of promotors for floatable silver compounds and recovering silver from the flotation tailing by solution methods.

4. A method according to claim 3 in which the recovery is by cyanidation.

5. A method according to claim 3 in which the ore contains a major portion of cerargyrite and a minor portion of argento-jarosite.

6. A method according to claim 3 in which the ore contains a major portion of cerargyrite and a minor portion of argento-jarosite.

7. A method of recovering silver from ores containing argento-jarosite and floatable silver compounds which comprises subjecting the ore to froth flotation in the presence of promotors for the flotation of silver compounds, subjecting the flotation tailing to a low temperature roast below 600° C. and recovering silver from the calcine by solution methods.

8. A method of recovering silver from ores containing argento-jarosite and floatable silver compounds which comprises subjecting the ore to froth flotation in the presence of promotors for the flotation of silver compounds, subjecting the flotation tailing to a low temperature roast not over 525° C. and recovering silver from the calcine by solution methods.

9. A method of recovering silver from ore containing argento-jarosite and floatable silver compounds comprising a combined treatment including the steps of froth flotation, low temperature roast under non-reducing conditions at a temperature not over 525° C., followed by leaching of the roast.

ROBERT R. PORTER.

CERTIFICATE OF CORRECTION.

Patent No. 2,144,932. January 24, 1939.

ROBERT R. PORTER.

It is hereby certified that error appears in the printed specification of the above numbered patent requiring correction as follows: Page 2, second column, line 18, claim 6, for the claim reference numeral "3" read 4; and that the said Letters Patent should be read with this correction therein that the same may conform to the record of the case in the Patent Office.

Signed and sealed this 7th day of March, A. D. 1939.

Henry Van Arsdale.

(Seal) Acting Commissioner of Patents.